(12) United States Patent
Martin, Jr.

(10) Patent No.: US 7,522,794 B2
(45) Date of Patent: Apr. 21, 2009

(54) MULTI-LAYERED WATER BLOCKING CABLE ARMOR LAMINATE CONTAINING WATER SWELLING FABRICS AND METHOD OF MAKING SUCH

(75) Inventor: Oscar L. Martin, Jr., Midlothian, VA (US)

(73) Assignee: Reynolds Packaging LLC, Richmond, VA (US)

( * ) Notice: Subject to any disclaimer, the term of this patent is extended or adjusted under 35 U.S.C. 154(b) by 66 days.

(21) Appl. No.: 11/092,260

(22) Filed: Mar. 29, 2005

(65) Prior Publication Data

US 2009/0074365 A1 Mar. 19, 2009

(51) Int. Cl.
*G02B 6/44* (2006.01)
(52) U.S. Cl. ........... 385/100; 385/102; 385/104; 385/106; 385/107; 385/111; 385/112; 385/113; 385/141
(58) Field of Classification Search ........... 385/100
See application file for complete search history.

(56) References Cited

U.S. PATENT DOCUMENTS

| | | | |
|---|---|---|---|
| 3,485,938 A | 12/1969 | Kingsley | |
| 3,602,633 A | 8/1971 | Miller et al. | |
| 3,681,515 A | 8/1972 | Mildner | 174/107 |
| 4,097,119 A | 6/1978 | Kumamaru et al. | 350/96.23 |
| 4,109,099 A | 8/1978 | Dembiak et al. | 174/107 |
| RE30,228 E | 3/1980 | Silver et al. | |
| 4,340,771 A | 7/1982 | Watts | |
| 4,378,462 A | 3/1983 | Arnold, Jr. et al. | 174/70 |
| 4,449,014 A | 5/1984 | Brezinsky | 174/107 |
| 4,484,023 A | 11/1984 | Gindrup | 174/102 |
| 4,533,784 A | 8/1985 | Olyphant, Jr. | |
| 4,647,720 A | 3/1987 | Vokey | 174/107 |
| 4,671,611 A | 6/1987 | Allemand et al. | |
| 4,731,504 A | 3/1988 | Achille et al. | 174/107 |
| 4,740,261 A | 4/1988 | Moser | 156/244.12 |
| 4,763,983 A | 8/1988 | Keith | 350/96.23 |
| 4,802,732 A * | 2/1989 | Fukuma et al. | 385/105 |
| 4,812,014 A * | 3/1989 | Sawano et al. | 385/13 |

(Continued)

FOREIGN PATENT DOCUMENTS

JP 06187843 A * 7/1994

OTHER PUBLICATIONS

"International Alloy Designations and Chemical Composition Limits for Wrought Aluminum and Wrought Aluminum Alloys," Unified North American and International Registration Records, The Aluminum Association, Inc. (Apr. 2004), pp. 1-25.

(Continued)

*Primary Examiner*—Frank G Font
*Assistant Examiner*—Mary A El Shammaa
(74) *Attorney, Agent, or Firm*—Greenberg Traurig LLP

(57) ABSTRACT

This invention discloses a multi-layered laminate armor wrap for use with a copper or fiber optic cable having at least one water absorbing fabric layer, at least one polymer layer, and at least one layer fabricated from a metal or a metal alloy. Each layer in the multi-layered laminate armor wrap is fused or adhered to the adjacent layers to form a fused or sealed laminate armor wrap. This invention also discloses a method of making such an armor wrap.

13 Claims, 1 Drawing Sheet

U.S. PATENT DOCUMENTS

| | | | |
|---|---|---|---|
| 5,095,176 A | 3/1992 | Harbrecht et al. | 174/23 |
| 5,243,876 A | 9/1993 | Mang et al. | 74/502.5 |
| 5,246,770 A | 9/1993 | Bottiglione et al. | 428/244 |
| 5,298,284 A | 3/1994 | Buckwald et al. | 427/203 |
| 5,380,376 A | 1/1995 | Fortin et al. | 148/440 |
| 5,408,562 A * | 4/1995 | Yoshizawa et al. | 385/112 |
| 5,642,452 A | 6/1997 | Gravely et al. | 385/113 |
| 5,649,041 A | 7/1997 | Clyburn, III et al. | 385/109 |
| 5,770,274 A | 6/1998 | Christel | 427/535 |
| 6,003,565 A | 12/1999 | Whittier et al. | 139/420 |
| 6,049,647 A | 4/2000 | Register et al. | 385/101 |
| 6,103,317 A * | 8/2000 | Asai et al. | 427/512 |
| 6,173,100 B1 | 1/2001 | Newton et al. | 385/109 |
| 6,195,486 B1 | 2/2001 | Field et al. | 385/100 |
| 6,198,865 B1 | 3/2001 | Risch | 385/113 |
| 6,255,591 B1 | 7/2001 | Ziemek | |
| 6,256,438 B1 * | 7/2001 | Gimblet | 385/109 |
| 6,287,679 B1 | 9/2001 | Pappas et al. | 428/304.4 |
| 6,294,268 B1 | 9/2001 | Muraoka et al. | 428/515 |
| 6,463,199 B1 | 10/2002 | Quinn et al. | 385/109 |
| 6,529,663 B1 | 3/2003 | Parris et al. | 385/113 |
| 6,631,229 B1 | 10/2003 | Norris et al. | 385/109 |
| 6,693,241 B2 | 2/2004 | Carlson et al. | |
| 6,785,450 B2 | 8/2004 | Wagman et al. | 385/100 |
| 6,897,382 B2 | 5/2005 | Hager et al. | |
| 7,027,696 B2 | 4/2006 | Nechitailo | |
| 7,084,343 B1 | 8/2006 | Visser | |
| 7,092,605 B2 | 8/2006 | Adams et al. | |
| 7,099,542 B2 | 8/2006 | Ledbetter et al. | |
| 7,179,522 B2 | 2/2007 | Hiel et al. | |
| 7,180,000 B2 | 2/2007 | Hager et al. | |
| 7,206,482 B2 | 4/2007 | Rhyne et al. | |
| 2003/0201115 A1 | 10/2003 | Carlson et al. | |
| 2004/0151448 A1 | 8/2004 | Adams et al. | 385/113 |
| 2005/0136257 A1 | 6/2005 | Easter | 428/375 |
| 2007/0272430 A1 | 11/2007 | Tuffile et al. | |
| 2008/0060832 A1 | 3/2008 | Razavi | |

OTHER PUBLICATIONS

Kissel, J.R., S.G. Pantelakis, G.N. Haidemenopoulos, Aluminum and Aluminum Alloys, Chapter 9, Handbook of Advanced Materials, online Jun. 8, 2004 (relevant pages).

* cited by examiner

MULTI-LAYERED WATER BLOCKING CABLE ARMOR LAMINATE CONTAINING WATER SWELLING FABRICS AND METHOD OF MAKING SUCH

FIELD OF THE INVENTION

This invention relates to copper or fiber optic cables. Specifically, this invention relates to a copper or fiber optic cable that is wrapped in a laminate armor structure that prevents water and moisture from entering the cable.

BACKGROUND OF THE INVENTION

In the past, copper cables were extensively used by the telecommunications industry to transmit data ranging from television to voice transmissions. However, as the need for transmitting larger amounts of information has become more prevalent, the copper cable is being rapidly replaced by the fiber optic cable.

The fiber optic cable is comprised of one or more optical fibers, which are small diameter glass strands that are capable of transmitting an optical signal over great distances, at high speeds, and with relatively low signal loss as compared to standard wire or copper cable networks. However, the data transmission of an optical fiber can be inhibited by a variety of factors. One way an optical fiber's signal may be inhibited is by the introduction of water or moisture into the fiber optic cable itself. Water, which has infiltrated into the cable, typically leads to signal degradation and transmission problems because the moisture interferes with the cable's optical signal which in turn reduces the cable's ability to transmit data. Additionally, because the optical fiber glass is sensitive to water other undesired side effects might result from water entering the cable. For instance, water that comes into contact with an optical fiber can lead to signal attenuation, which shortens the life span of the fibers, or to mechanical damage at or below freezing temperatures (0° C. or 32° F.) as the water freezes over the fibers. These side effects, however, are not limited to fiber optic cables since traditional copper cables are also susceptible to water damage if water is introduced into the cable.

Water can enter a copper or fiber optic cable in a variety of ways. For example, rodents biting into the cable armor and/or environmental pressures can all cause holes to develop in the walls of the cable thereby providing water and moisture an entryway into the cable. To prevent the introduction of water and moisture into the copper or fiber optic cables, cable manufacturers typically flood the armor cable wrap with a hydrophobic petroleum based flooding agent and/or wrap the copper or fiber optic wires with paper. Both of these techniques rely on forming a barrier between the copper or fiber optic wires and the cable wrap armor in order to block and prevent the introduction of water into the cable, which can subsequently lead to propagation of moisture along the length of the cable. However, these techniques have traditionally increased the cost and production time associated with fabricating a copper or fiber optic cable since additional material (e.g. flooding agents, paper, etc. . . . ) and processing steps are required.

Therefore, there exists a need for preventing the introduction of water and moisture into a copper or fiber optic cable while reducing the total amount of time and costs associated with fabricating the cable.

This invention is a response to this need by providing a multi-layered laminate armor structure that prevents water and moisture from entering the copper or fiber optic cable and a method of making such.

SUMMARY OF THE INVENTION

This invention discloses a multi-layered laminate armor wrap for use with a copper or fiber optic cable having at least one water absorbing fabric layer, at least one polymer layer, and at least one layer fabricated from a metal. Each layer in the multi-layered laminate armor wrap is fused or adhered to at least one adjacent layer to form the sealed laminate armor wrap. This invention also discloses a method of making such an armor wrap.

In one embodiment, the multi-layered laminate armor includes a water absorbing fabric first layer, a second layer fabricated from a polymer, a third layer fabricated from a metal or a metal alloy, and a fourth layer fabricated from a polymer.

In one embodiment, the multi-layered laminate armor includes a water absorbing fabric first layer, a second layer fabricated from a metal or a metal alloy, and third layer fabricated from a polymer.

In one embodiment, the water absorbing fabric layer and the polymer layer are located on both sides of the metal or metal alloy layer.

In one embodiment, the water absorbing fabric contains polyacrylic acid particles within the fabric structure.

In one embodiment, the water absorbing fabric is a carded polyester non-woven material.

In one embodiment, the metal or metal alloy layer is fabricated from a metal such as steel or aluminum.

In one embodiment, the aluminum is fabricated from the Aluminum Association's 1145, 1235, 8079, or 8111 aluminum alloys.

In one embodiment, the polymer layer is ethylene acrylic acid (EAA) or a coextruded blend thereof.

In one embodiment the multiple layers of the laminated armor wrap are fused using a thermal lamination process. Other processes that may be used would include adhesive lamination or powder lamination. The layers in the laminate may also be fused by applying an adhesive between the adjacent layers followed by a nip and an oven processing step.

One aspect of this invention is to prevent optical signal degradation caused by moisture that infiltrates into the copper or fiber optic cable.

Another aspect of this invention is to disclose a structure that exhibits both armoring and water blocking properties so that the total cost and time required to manufacture a copper or fiber optic cable may be reduced.

DETAILED DESCRIPTION OF PREFERRED EMBODIMENTS

Figure 1:
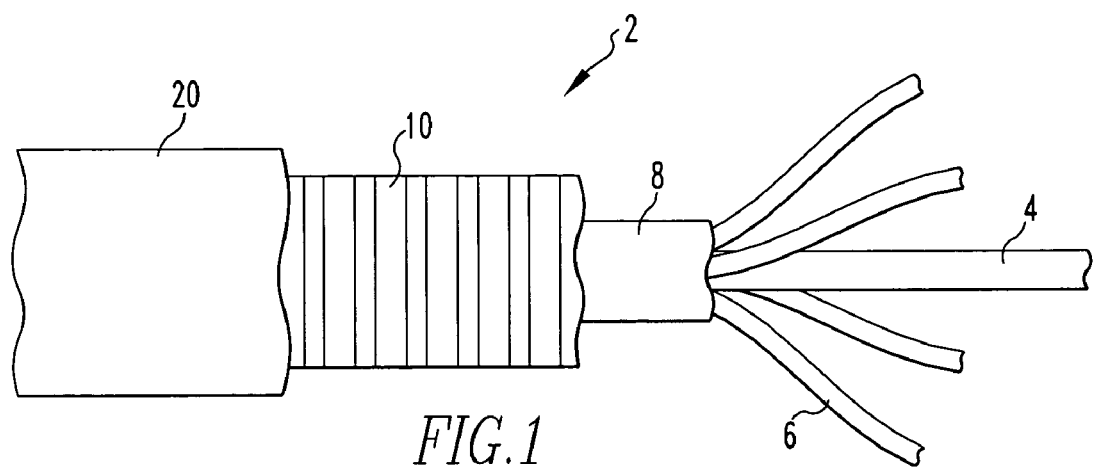
FIG. 1 depicts a copper or fiber optic cable having the multi-layered laminate armor structure as disclosed in this invention.

The accompanying figures and the description that follows set forth this invention in its preferred embodiments. However, it is contemplated that persons generally familiar with copper or fiber optic cables will be able to apply the novel characteristics of the structures and methods illustrated and described herein in other contexts by modification of certain details. Accordingly, the figures and description are not to be taken as restrictive on the scope of this invention, but are to be understood as broad and general teachings. When referring to any numerical range of values, such ranges are understood to include each and every number and/or fraction between the stated range minimum and maximum. For purposes of the description hereinafter, the terms "upper", "lower", "right", "left", "vertical", "horizontal", "top", "bottom", and derivatives thereof shall relate to the invention, as it is oriented in the drawing figures.

This invention discloses a copper or fiber optic cable having a multi-layered laminate armor structure that prevents or inhibits water from coming into contact with the cable's copper or optical fibers thereby preventing signal degradation.

As can be seen in FIG. 1, the copper or fiber optic cable 2 includes a strength member 4 surrounded by one or more copper or optical fibers 6. The strength member 4 is fabricated from materials that are commonly known in the art such as a steel rod thereby providing rigidity and structure to the copper or optical cable 2. The copper or optical fibers 6 act as a core wrap by wrapping around the strength member 4. In FIG. 1, the copper or optical fibers 6 are oriented substantially parallel to an axis of the strength member 4. However, one skilled in the art would appreciate that the copper or optical fibers 6 may have other orientations. For example, the copper or optical fibers 6 can be wound around the strength member 4 in a substantially helical pattern. Surrounding the copper or optical fibers 6 is an inner jacket 8 that holds the optical fibers 6 in place over the strength member 4. The inner jacket 8 can be fabricated from a variety of materials. For instance, the inner jacket 8 can be formed from a non-conductive medium density polyethylene that meets ASTM D1248 specifications. It is noted that one skilled in the art would recognize that additional support members (not shown) may be embedded in or wrapped around the inner jacket 8 thereby providing further structural support to the fiber optic cable 2. As depicted in FIG. 1, the inner jacket 8 is surrounded by the multi-layered laminate armor wrap 10.

Figure 2:
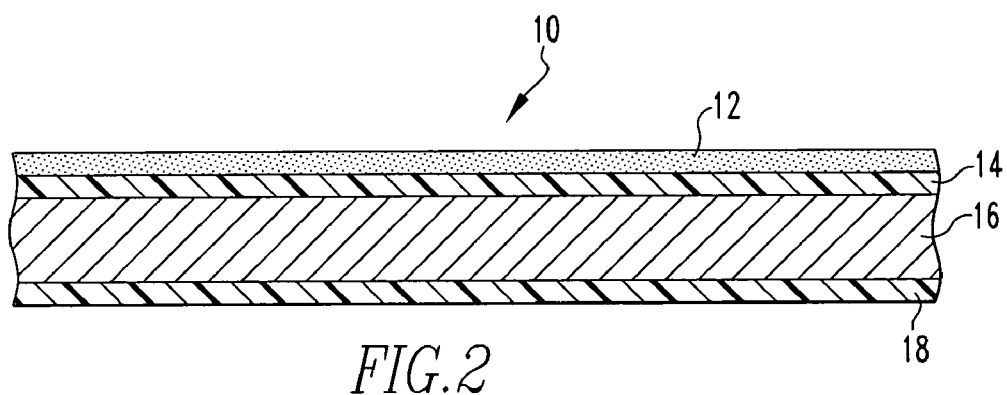
FIG. 2 is a profile of one embodiment of the multi-layered laminate armor structure disclosed in this invention.

FIG. 2 depicts one embodiment of the invention. As can be seen in FIG. 2, the multi-layered laminate armor 10 includes a first layer 12, a second layer 14, a third layer 16, and a fourth layer 18. The first layer 12 is comprised of a water absorbing fabric that is commonly known in the art. For instance, the water absorbing fabric can be a carded polyester nonwoven material or can contain super absorbent-polyacrylic acid particles within the fabric structure. Additionally, the fabric can have a minimum basis weight of about 20 grams per square meter. The first layer 12 is typically positioned adjacent to the inner jacket 8.

The second layer 14 has a minimum thickness of about 2.54 µm (0.00010 inches), is adhered to the water absorbing first layer, and is made from a polymer or blend of polymers. A typical polymer that may be used would include, but shall not be limited to, ethylene-acrylic acid (EAA) or a coextruded blend of EAA.

The armoring property of the multi-layered laminate is provided by the third layer 16 which is adhered to the second layer 14. In this embodiment, the second layer 14 acts as a tie-layer between the first and third layers 12, 16. The third layer 16 is usually fabricated from a metal such as steel or aluminum having a thickness of at least 8.89 µm (0.00035 inches). The third layer 16 can also be fabricated from a metal alloy such as the Aluminum Association's 1145, 1235, 8079, or 8111 aluminum alloys.

Finally, a fourth layer 18 made from a polymer is adhered to the armoring third layer 16. The polymer in the fourth layer 18 can either be the same type of polymer used in the second layer 14 or of a different type and has a minimum thickness of about 2.54 µm (0.00010 inches).

Each of the layers 12, 14, 16, and 18 is adhered to the adjacent layer by a thermal lamination process. In the thermal lamination process, the unbonded layers of the multi-laminate armor 10 are passed through counter rotating steel rolls, rubber rolls, or belts that are heated. The temperature of the heated rolls/belts can be about 148.8° C. (300° F.). This temperature, however, is not meant to be limiting since one skilled in the art would appreciate that other temperatures may also be used to laminate the unbonded layers together to form the laminate. The layers are thermally bonded to one another as the layers pass between the heated counter rotating rolls or belts, which exert a pressure of about 80 psi on the layers. The exit speed of the thermal lamination process is about 200 feet per minute. It is noted the adjacent layers can be also adhered by using adhesive lamination, powder lamination, or by applying adhesive or glue between the layers followed by a nip (i.e. passing the layers between one or more rolls/belts) and an oven processing step.

Even though FIG. 2 depicts the multi-layered laminate armor wrap 10 as having four layers, one having ordinary skill in the art would appreciate that other layer combinations and/or number of layers may be used. For instance, the multi-layered laminate armor 10 may include only a water absorbing layer 12, a metal layer 16, and a polymer layer 14. Another embodiment could have a water absorbing 12 and polymer layer 14 located on one or both sides of the metal layer 16. Yet another embodiment could have the water absorbing layer 12 located adjacent to the metal layer 16, which is adjacent to the polymer layer 14.

As can be seen in FIG. 1, the multi-layer laminate armor wrap 10 is surrounded by an outer jacket 20. Similar to the inner jacket 8, the outer jacket 20 may also be fabricated from a low density polyethylene. The low density polyethylene used in the outer jacket 20 can either be the same type of low density polyethylene used in the inner jacket 8 or of a different type. Additional support members (not shown) may be embedded in or wrapped around the outer jacket 20 in order to provide further structural support to the fiber optic cable 2.

TABLE 1

| Characteristics of Multi-layered Laminate Armor Wrap | |
|---|---|
| Absorbency, (ml of water/g material) | 5.52 |
| Thickness (µm) | 4.40 |
| Bond Strength, lb/in (laminate-laminate) | |

As can be seen in Table 1, the multi-layered laminate armor wrap is able to absorb about 5.52 ml of water per gram of material. Current industry standards for water absorption calls for a minimum of about 1.0 ml of water per gram of material. In other words, this invention is able to absorb about 82% more water than is required by current industry standards. As can be seen in Table 1, the total thickness of the multi-layered laminate armor structure is about 4.40 µm. Finally, the bond strength of the multi-layered laminate was tested by heat sealing a water absorbing fabric layer 12 to the first EAA layer 14 of another laminate sample. The first EAA layer 14 of the other laminate was bonded to a steel layer 16, which was bonded to a second EAA layer 18. The water absorbing fabric layer 12 and the other laminate were then passed between two counter rotating rollers that were heated to a temperature of about 204.4° C. (400° F.). The pressure that was exerted on the layers by the rollers was about 60 psi. The resulting multi-layered test laminate was then tested per ASTM specifications. Table 1, shows that the bond strength of the multi-layered laminate structure was about 10 lbs/in., which is about 50% higher than the minimum 5 lbs/in. industry standard.

Figure 3:
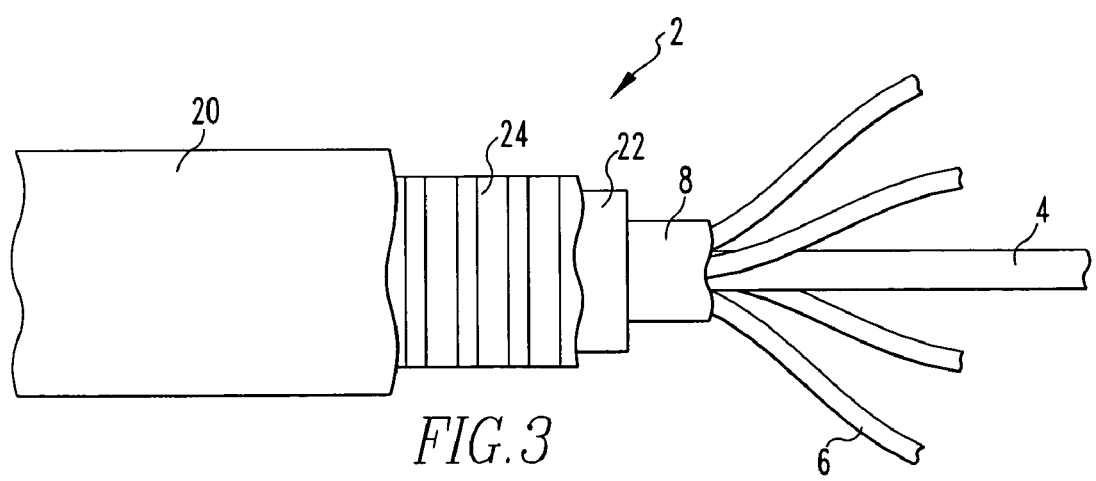
FIG. 3 depicts a copper or fiber optic cable utilizing current techniques for preventing water entry into the cable.

As can be seen in FIG. 3, current practice requires that the copper or fiber optic cable manufacturer position a flooding agent or water absorbing tape/paper 22 between the inner jacket 8 and the armor cable wrap 24 in order to prevent water and/or moisture from interfering with the copper or fiber optic cable's 2 transmission efficiency.

Applicant's multi-layer laminate armor wrap 10 eliminates the need for cable manufacturers having to purchase flooding agents (e.g. petroleum based flooding agents), papers, or water blocking tapes by disclosing a cable wrap that provides both armoring and water blocking functionalities. Additionally, the disclosed invention reduces the number of steps needed to manufacture a fiber optic cable since the processing step of setting up and applying the flooding agents or wrapping the inner jacket 8 in paper or water blocking tape is no longer necessary since the laminate armor wrap is capable of preventing water from entering the optical cable.

Having described the presently preferred embodiments, it is to be understood that the invention may be otherwise embodied within the scope of the appended claims.

What is claimed is:

1. A multi-layered armor wrapped for use with a copper or fiber optic cable comprising:
   at least one water absorbing fabric layer,
   at least one polymer layer, and
   at least one layer fabricated from a metal or a metal alloy;
   the at least one water absorbing layer, at least one polymer layer, and at least one layer fabricated from a metal or a metal alloy all being thermally fused together to form a monolithic, substantially water-impermeable barrier for surrounding said copper or fiber optic cable.

2. A multi-layered armor wrap for use with a copper or fiber optic cable according to claim 1 wherein said multi-layered armor wrap comprises a water absorbing first layer, a second layer that is over and adhered to said first layer, said second layer being fabricated from a polymer, a third layer that is over and adhered to said second layer, said third layer being fabricated from a metal or a metal alloy, and a fourth layer that is over and adhered to said third layer, said fourth layer being fabricated from a polymer.

3. A multi-layered armor wrap for use with a copper or fiber optic cable according to claim 1 wherein said multi-layered armor wrap comprises a water absorbing first layer, a second layer that is over and adhered to said first layer, said second layer being fabricated from a metal, and a third layer that is over and adhered to said second layer, said third layer being fabricated from a polymer.

4. A multi-layered armor wrap for use with a copper or fiber optic cable according to claim 1 wherein said water absorbing fabric includes polyacrylic acid particles within the fabric structure or is a carded polyester non-woven material.

5. A multi-layered armor wrap for use with a copper or fiber optic cable according to claim 1 wherein said metal or metal alloy is steel or aluminum.

6. A multi-layered armor wrap for use with a copper or fiber optic cable according to claim 5 wherein said aluminum is selected from the Aluminum Association's 1145, 1235, 8079, or 8111 aluminum alloys.

7. A multi-layered armor wrap for use with a copper or fiber optic cable according to claim 1 said metal or metal alloy layer has a thickness of at least about 8.89 μm (0.00035 inches).

8. A multi-layered armor wrap for use with a copper or fiber optic cable according to claim 1 wherein said polymer layer is fabricated from EAA or a coextruded blend of EAA.

9. A multi-layered armor wrap for use with a copper or fiber optic cable according to claim 1 wherein said polymer layer has a thickness of at least about 2.54 μm (0.00010 inches).

10. A multi-layered armor wrap for use with a copper or fiber optic cable according to claim 1 wherein the heat fusing is using a thermal lamination process, an adhesive lamination process, a powder lamination process, or by applying an adhesive between said adjacent layers followed by a nip and an oven processing step.

11. A multi-layered armor wrap for use with a copper or fiber optic cable according to claim 1 wherein said multi-layered laminate armor wrap has a thickness of about 4.40 μm.

12. A copper or fiber optic cable comprising:
   a strength member positioned adjacent to and surrounded by one or more copper or optical fibers;
   an inner jacket surrounding said copper or optical fibers, said inner jacket having an interior surface and an exterior surface, said interior surface is adjacent to said copper or optical fibers; and
   a multi-layered laminate armor wrap substantially surrounding said inner jacket, said multi-layered laminate armor wrap having at least one water absorbing fabric layer, at least one polymer layer, and at least one layer fabricated from a metal or a metal alloy, said multi-layered laminate armor wrap having an interior surface and an exterior surface, said interior surface of said multi-layered laminate armor wrap positioned adjacent to said exterior surface of said inner jacket;
   the at least one water absorbing layer, at least one polymer layer, and at least one layer fabricated from a metal or a metal alloy all being thermally fused together to form a monolithic, substantially water-impermeable barrier for surrounding said copper or optical fibers; and
   an outer jacket surrounding said multi-layered laminate armor wrap, said outer jacket having an interior surface and an exterior surface, said interior surface of said outer jacket positioned adjacent to said exterior surface of said multi-layered laminate armor wrap.

13. A multi-layered armor wrap for use with a copper or fiber optic cable according to claim 12 wherein each of said interior and exterior jackets are fabricated from a low density polyethylene.

* * * * *